Aug. 31, 1965  N. T. GENERAL  3,203,277
VARIABLE SPEED TRANSMISSION
Filed Dec. 10, 1962

NORMAN T. GENERAL
INVENTOR.

BY John R. Faulkner
Robert E. McCollum
ATTORNEYS

United States Patent Office 3,203,277
Patented Aug. 31, 1965

3,203,277
VARIABLE SPEED TRANSMISSION
Norman T. General, Farmington, Mich., assignor to Ford Motor Company, Dearborn, Mich., a corporation of Delaware
Filed Dec. 10, 1962, Ser. No. 243,383
10 Claims. (Cl. 74—689)

This invention relates to a transmission for use in a motor vehicle, and more particularly to one having the advantages of both a step-shift type of automatic transmission and one providing infinitely variable changes in power ratios.

The step-shift transmission generally has a number of step-like or spaced speed and torque ratio changes controlled as best as possible to avoid jarring sensations being communicated to the operator upon disengagement of one and engagement the other. This type of transmission is advantageous from an efficiency and performance standpoint. On the other hand, the infinitely variable type of transmission provides an infinite number of speed and torque ratios, with efficiency being sacrificed to some degree for the very smooth transitions between the different ratios.

The invention relates to the construction of a transmission that has the performance and efficiency of a step-shift type transmission at low vehicle speeds, and the smoothness of the infinitely variable drive during transitions to higher speed ranges. This is accomplished by providing a split torque power path from a fluid coupling to a planetary gearset, one path of which includes a pair of serially connected belt drive assemblies. Torque is provided at all times directly to the gearset through one path, with selectively operable means for coupling the other torque path to the gearset.

It is, therefore, an object of the invention to provide a transmission construction combining a variable speed belt drive mechanism and a hydrodynamic drive device to provide a split torque power path to a gearset for producing smooth transitions between speed ratio changes.

It is also an object of the invention to provide a transmission construction having a fluid coupling providing a split torque power path to a two-speed planetary gearset, one path of which includes a pair of serially connected belt drive mechanisms.

It is a still further object of the invention to provide a transmission construction wherein low-speed forward reduction drives are obtained by the combination of a hydrodynamic drive device and a planetary gearset, higher speed drives are obtained by additionally driving the gearset by a pair of serially connected belt drive mechanisms, and a reverse drive is obtained either by controlling the rotation of the gearset elements individually, or providing separate gearing for reversing the direction of rotation of the belt drive assemblies.

Other objects, features, and advantages of the invention will become apparent upon reference to the succeeding detailed description of the invention, and to the drawings illustrating the preferred embodiments thereof, wherein.

Figures 1, 2:
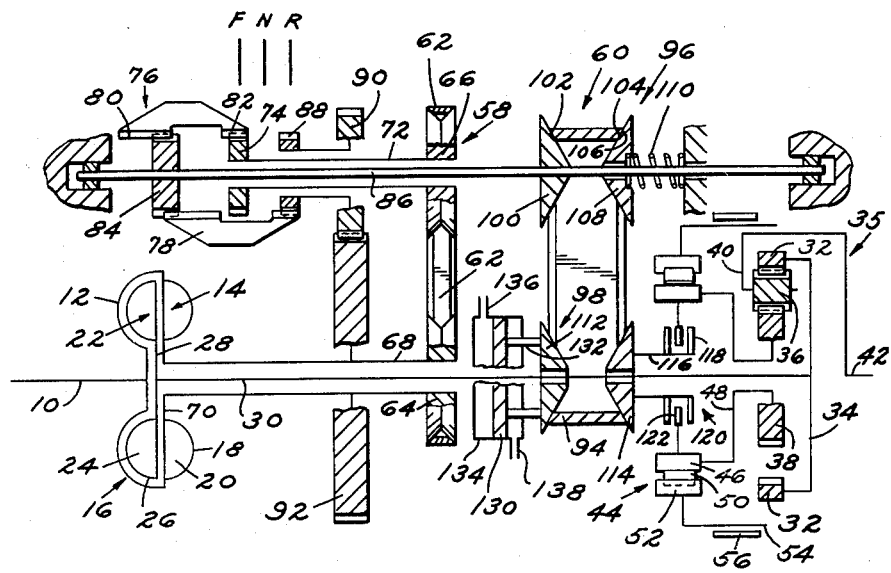
FIGURE 1 is a schematic illustration of one embodiment of the invention.
FIGURE 2 is a modification of the transmission of FIGURE 1.

The figure shows a transmission having a forwardly rotating power input shaft 10 adapted to be driven by the output shaft of an engine (not shown) such as, for example, the internal combustion engine for a motor vehicle. Shaft 10 is connected by a shell member 12 to the rotatable impeller or pump 14 of a conventional fluid coupling 16. The pump has a semi-toroidal outer shroud 18 to which are secured dish-shaped blades 20. The pump faces a turbine member 2 having similarly shaped blades 24 secured within an outer shroud 26. The shrouds together define a toroidal path for the circulation of fluid from the pump to the turbine and back again in a known manner to transmit torque therebetween smoothly and efficiently.

Turbine 22 is drive connected by a flange 28 to one end of a main shaft 30 having an annulus or ring gear 32 secured to its opposite end by a connector 34. The ring gear constitutes one drive element of a simple two-speed planetary gearset 35 having a number of pinions 36 meshing with the ring gear and a sun gear 38. The pinions are rotatably supported upon a carrier member 40 connected directly to the power output shaft 42.

The gearset can be conditioned for a reduction drive at a relatively fixed ratio by holding sun gear 38 stationary and driving ring gear 32 by turbine 22, or infinitely variable changes to higher speed drives can be made by driving the sun and ring gears forwardly at the same time at varying speeds.

Sun gear 38 is held against rotation in a reverse or counterclockwise direction as viewed from the left of FIGURE 1 by means of a mechanical one-way coupling or brake 44. The brake has an inner annular race 46 secured to the sun gear by a connector 48, and is separated by sprags or rollers 50 from an outer race 52. The outer race has a drum extension portion 54 adapted to be engaged by a fluid pressure or otherwise actuated brake band 56. Engagement of the band prevents reverse rotation of sun gear 38 in a known manner by locking up the brake, while overrun in a forward or clockwise direction is permitted by release of the brake.

The sun gear 38 is adapted to be driven from pump 14 through two serially connected endless belt drive assemblies 58 and 60. Assembly 58 is of the fixed ratio type having an endless belt 62 wrapped around V-sectioned drive and driven pulleys 64 and 66 of substantially the same diameter. Pulley 64 is fixed to one end of a sleeve shaft 68, the opposite end of which is driven by pump 14 through a connector 70. Driven pulley 66 is similarly fixed to a sleeve shaft 72 having clutch teeth 74 formed at one end for engagement with a forward, neutral, and reverse clutch 76.

The clutch includes a sleeve 78 with spaced internal teeth 80 and 82. The sleeve is slidably mounted on a gear 84 fixed to a shaft 86 rotatably mounted in the transmission housing. The sleeve can be moved, by means not shown, to engage teeth 82 with either teeth 74, to effect a drive gear 84 by belt drive 58, or with teeth 88 formed on a reversing gear 90. Gear 90 meshes with a gear 92 fixed on shaft 68. Sleeve 78 can also be moved to a neutral position between teeth 74 and 88 to interrupt the drive to gear 84.

While not shown, a clutch synchronizer would be provided between the sleeve 78 and teeth 74 and 88 to permit engagement of the sleeve with the teeth without clashing. The synchronizer would have the usual blocker ring elements and conical friction surfaces for providing synchronism between the relatively rotating elements.

It will be apparent, therefore, that the movement of clutch sleeve 78 to the forward or F position, indicated in FIGURE 1 by the portion of the sleeve above its axis, effects a forward drive of shaft 86 by pump 14, while movement of the sleeve to the reverse or R position indicated by the sleeve portion below its axis will effect a reverse drive of shaft 86.

Shaft 86 is drive connected to sun gear 38 through belt drive assembly 60, which comprises an endless belt 94 wrapped around drive and driven V-sectioned pulleys 96 and 98. The pulley 96 has a disc 100 fixed to shaft 86, the disc having an internal face conically tapered or beveled for frictionally driving the mating edge 102 of belt 94. The opposite edge 104 of the belt frictionally bears against the beveled face 106 of a pulley disc 108 axially slidably journaled on shaft 86. Disc 108 is connected to disc 100 for rotation therewith by means of a plurality of tie bolts (not shown), and has a spring 110 bearing against it constantly loading the discs and belt together.

The similarly shaped counterpart pulley assembly 98 includes a disc 112 slidably and rotatably mounted on turbine shaft 30 and cooperating with belt 94 and a disc 114. Disc 114 is also rotatably mounted on shaft 30 and is fixed to disc 112 by tie bolts (not shown), and to a sleeve shaft 116. The shaft has the annular driving discs 118 of a friction clutch 120 secured to it for cooperation with a disc 122 secured to the inner race 46 of one-way brake 44. Engagement of the clutch drive connects the belt drive assemblies to sun gear 38.

The drive ratio of belt assembly 60 is adjusted by movement of discs 112 and 108 to vary the effective pitch diameter of pulleys 98 and 96. For this purpose, the disc 112 is secured to a piston 130 by a rod 132, the piston being selectively reciprocated in opposite directions in a cylinder 134 by fluid admitted through lines 136 or 138. The belt 94 is progressively moved to vary its effective diameter on pulleys 96 and 98 in inverse proportion to each other to change the drive ratio from an underdrive to an overdrive, the movement of disc 108 against spring 110 permitting such action.

In operation, neutral is obtained by disengaging band 56 and clutch 116, and moving clutch sleeve 78 to its N position. Drive of the ring gear 32 by turbine 26 causes the gearset to merely idle without producing a drive of the output shaft 42.

Low speed forward drive is obtained by applying brake band 56. Forward or clockwise rotation of input shaft 10 in the direction of arrow 146 rotates pump 14 and turbine 26 in the same direction to rotate ring gear 32 forwardly at the speed of turbine 26. Reverse rotation of sun gear 38 is prevented by engagement of one-way brake 44, and pinions 36 therefore are caused to walk or planetate about the sun gear to drive carrier 40 forwardly at a reduced speed with respect to that of shaft 10. With the clutch 120 and clutch sleeve 78 disengaged, the belt drive assemblies contribute no drive.

When a change to higher drive ranges is desired, clutch 120 is engaged, clutch sleeve 78 is moved to its F position, and piston 130 conditions the belt drive for its lowest drive ratio. Band 56 remains engaged. Continued forward rotation of shaft 10 therefore continues to drive ring gear 32 in the manner described. Sun gear 38, however, is now driven forwardly slowly by means of belt drive 58, clutch 76, belt drive 60, and clutch 120, brake 44 overrunning. The slow forward rotation of sun gear 38 smoothly increases the speed of carrier 40.

For further speed increases, belt drive assembly 60 is adjusted by progressively moving piston 130 to vary the effective pitch diameter of pulleys 96 and 98. The sun gear will therefore increase in speed to a point where it is equal to that of the ring gear, whereupon the gearset in effect locks up and carrier 40 is rotated at turbine shaft speed. Further changes in the speed of sun gear 38 cause it to be overdriven with respect to the speed of pump 14, causing carrier 40 also to be overdriven. The slower rotating ring gear at this point would become the reaction member for the gearset.

Reverse drive is obtained by moving clutch sleeve 78 to the R position, engaging clutch 120, disengaging band 56, and adjusting belt drive assembly 60 for an overdrive ratio. Forward drive of input shaft 10 drives pump 14 and turbine 26 forwardly to rotate ring gear 32 in the same direction. Sun gear 38 is overdriven in a reverse direction with respect to pump 14 by means of the reversing gears 92 and 90, clutch 76, belt drive assembly 60, clutch 120 and brake 44, which at this time engages but is free to rotate reversely. The overdrive reverse rotation of sun gear 38 causes carrier 40 to walk around rearwardly within the forwardly rotating ring gear to drive carrier 40 at a reduced speed with respect to pump 14, and in the opposite direction.

FIGURE 2 shows a modification of the FIGURE 1 transmission, the changes for the most part consisting of replacing the forward and reverse clutch 76, the reversing gears 90 and 92, and the gearset 35, of FIGURE 1, with an intermeshing double pinion planetary gearset 235 having a brake band applicable to the ring gear for obtaining a reverse drive.

More specifically, the turbine 226 is directly connected by a shaft 230 to a first sun gear 238 of a planetary gearset 235. Sun gear 238 meshes with a first pinion 240 meshing with a second pinion 242. Pinion 242 in turn meshes with both a ring gear 244 and a second smaller sun gear 246, this sun gear being connected to the inner race 248 of a one-way brake 250. The brake is similar to brake 44 of FIGURE 1, its outer race being held against rotation upon application of a band 252. The pinions 240 and 242 are rotatably mounted upon a carrier 253 connected directly to output shaft 254. A fluid pressure or other suitably actuated band 255 may be applied to the ring gear drum 256 to provide a reverse drive in a manner to be described.

The drive to sun gear 238 is from turbine 226. The drive to sun gear 246 is from pump 214 through belt drives 258 and 260, which are identical in construction to belt drive assemblies 58 and 60 of FIGURE 1, and therefore will not be described in detail. Belt drive 260 is driven from belt drive 258 by the driven and driving pulley assemblies 262 and 264, respectively, being mounted on a common shaft 265.

The gearset of FIGURE 2 is conditioned for Neutral by disengaging bands 252 and 255 and clutch 266.

A forward reduction drive at a relatively fixed ratio is established by engaging band 252 and driving sun gear 238 from turbine 226. The forward drive of the sun gear attempts to rotate sun gear 246 rearwardly, which movement is prevented by one-way brake 250. The pinions 240 and 242 therefore planetate forwardly about the stationary sun gear to drive carrier 253 forwardly at a speed reduced from that of turbine 226. The ring gear 244 merely idles freely.

Higher speed ranges are obtained by additionally engaging clutch 266 to drive sun gear 246 forwardly at the compounded speeds of belt drives 258 and 260. Adjustment of the belt drive 260 in the manner described in connection with FIGURE 1 drives sun gear 246 between underdrive and overdrive ratios to smoothly increase the speed of carrier 253 from an underdriven condition to one of being overdriven.

A reverse drive is obtained by engaging band 255 and disengaging clutch 266 and band 252. Forward rotation of turbine 226 therefore rotates sun gear 238 forwardly to cause pinions 240 and 242 to planetate rearwardly within the stationary ring gear 244. The carrier 253 and output shaft 254 are therefore driven in a reverse direction at a speed reduced from that of input shaft 210. The belt drives 258 and 260 and sun gear 246 merely idle freely without adding to the drive.

From the foregoing, it will be seen that the invention provides a transmission having a fixed ratio low speed forward drive, with transitions to higher speed ranges being made smoothly through the use of a split torque power path to the gearset including a variable belt drive. A reverse drive is obtained in one embodiment by the use of a separate gearset, or in another embodiment by the use of the same gearset that provides the forward drive.

While the invention has been illustrated in its preferred embodiments in the figures, it will be clear to those skilled in the arts to which the invention pertains that many changes and modifications may be made thereto without departing from the scope of the invention.

I claim:

1. A transmission having a forwardly rotating input shaft and an output shaft, and means operatively connecting said shafts providing a plurality of forward speed drives therebetween, said means including a hydrodynamic drive device connected to said input shaft, a gear set having a plurality of rotatable members including a driven member connected to said output shaft, means for holding one member of said gearset against rotation in one direction to condition said gearset for one drive while permitting said member to rotate in the opposite direction, said drive device having a plurality of rotatable elements operatively connected to rotatable members of said gear set for providing split torque power paths to said gear set, the operative connection between one of said rotatable elements and one gearset member including a selectively engageable means, the drive through one of said paths alone providing one forward drive range through said transmission, another of said paths including a belt drive mechanism, the concurrent drive through said one and another paths upon engagement of said selectively engageable means providing a second forward drive range through said transmission.

2. A transmission having a forwardly rotating input shaft and an output shaft, and means operatively connecting said shafts providing a plurality of forward speed drives therebetween, said means including a hydrodynamic drive device connected to said input shaft, a gear set having a plurality of rotatable members including a driven member connected to said output shaft, means for holding one member of said gearset against rotation in one direction to condition said gearset for one drive while permitting said member to rotate in the opposite direction, said drive device having a plurality of rotatable elements operatively connected to rotatable members of said gear set providing split torque power paths to said gear set, the operative connection between one of said rotatable elements and one gearset member including a selectively engageable means, the drive through one of said paths alone providing one forward drive range of said transmission, another of said paths including an adjustable infinitely variable speed belt drive mechanism, the concurrent drive through said one and another paths upon engagement of said selectively engageable means providing a second infinitely variable speed forward drive range through said transmission.

3. A transmission as in claim 2, wherein said means for holding one member of said gearset against rotation in one direction includes a one-way coupling means that conditions said gear set for a reduction drive during drive through said one range, said selectively engageable means comprising clutch means engageable to operatively clutch said mechanism to said one rotatable member to condition said gear set for a different drive during drive through said second range.

4. A transmission having a forwardly rotating input shaft and an output shaft, and means operatively connecting said shafts providing a plurality of forward speed drives therebetween, said means including a hydrodynamic drive device connected to said input shaft, a gear set having a plurality of rotatable members including a driven member connected to said output shaft, means for holding one member of said gearset against rotation in one direction to condition said gearset for one drive while permitting said member to rotate in the opposite direction, said drive device having a plurality of rotatable elements operatively connected to rotatable members of said gear set providing split torque power paths to said gear set, the operative connection between one of said rotatable elements and one gearset member including a selectively engageable means, the drive through one of said paths alone providing one forward drive range of said transmission, another of said paths including a plurality of serially connected belt drive mechanisms, the concurrent drive through said one and another paths upon engagement of said selectively engageable means providing a second forward drive range through said transmission.

5. A transmission having a forwardly rotating input shaft and an output shaft, and means operatively connecting said shafts providing a plurality of forward speed drives and a reverse drive therebetween, said means including a hydrodynamic drive device connected to said input shaft, gearing having a plurality of rotatable members including a driven member connected to said output shaft, releasable means for holding one member of said gearset against rotation in one direction to condition said gearset for one drive while permitting said member to rotate in the opposite direction, said drive device having a plurality of rotatable elements operatively connected to rotatable members of said gearing providing split torque power paths to portions of said gearing, the operative connection between one of said rotatable elements and one gearset member including a selectively engageable means, the drive through one of said paths alone providing one forward drive range of said transmission, another of said paths including a variable speed belt drive mechanism, the concurrent drive through said one and another paths upon engagement of said selectively engageable means providing a second forward infinitely variable speed drive range through said transmission, said gearing including means for reversing the direction of rotation of said output shaft upon release of said releasable means and engagement of said engageable means to provide a reverse drive.

6. A transmission having a forwardly rotating input shaft and an output shaft, and means operatively connecting said shafts providing a plurality of forward speed drives therebetween, said means including a fluid coupling having a rotatable pump and turbine, a planetary gear set having a sun gear and planet pinions and a ring gear and pinion carrier, means connecting said pump to said input shaft and said turbine to said ring gear, means connecting said carrier to said output shaft, means for holding said sun gear against rotation in one direction to condition said gearing for one drive while permitting rotation of said sun gear in the opposite direction, selectively engageable means operatively connecting said pump to said sun gear to provide split torque power paths from said coupling to said gear set, the drive to one of said sun or ring gears alone providing said one forward drive range through said transmission, one of said paths including a variable speed belt drive mechanism, the concurrent drive of both said sun and ring gears upon engagement of said engageable means providing a second forward infinitely variable drive range through said transmission.

7. A transmission having a forwardly rotating input shaft and an output shaft, and means operatively connecting said shafts providing a plurality of forward speed drives therebetween, said means including a fluid coupling having a rotatable pump and turbine and a planetary gear set including a plurality of sun gears, pinions and a carrier member, means connecting said pump to said input shaft, means connecting said carrier member to said output shaft, further means operatively connecting said pump and turbine to different ones of said sun gears providing split torque power paths from said coupling to said gear set, means for holding one of said sun gears against rotation in one direction to condition said gearing for one drive while permitting rotation of said one of said sun gears in the opposite direction, said further means including selectively engageable means in one of said paths, the drive of one of said sun gears alone providing one forward drive range of said transmission, another of said paths including a variable speed belt drive mechanism, the concurrent drive of both of said sun gears upon engagement of said engageable means providing a second forward infinitely variable speed drive range through said transmission.

8. A transmission having a forwardly rotating input shaft and an output shaft, and means operatively connecting said shafts providing a plurality of forward speed drives and a reverse drive therebetween, said means including a fluid coupling having a rotatable pump and turbine, a planetary gear set having a sun gear and planet pinions and a ring gear and pinion carrier, means connecting said pump to said input shaft and said turbine to said ring gear, means connecting said carrier to said output shaft, releasable means for holding said sun gear against rotation in one direction to condition said gearing for one drive while permitting rotation of said sun gear in the opposite direction, further selectively engageable means operatively connecting said pump also to said sun gear in one power path providing a split torque power path from said coupling to said gear set, the drive to one of said sun or ring gears alone providing one forward drive range through said transmission, said one path including a variable speed belt drive mechanism comprising a pair of endless belt drives serially connected, said one path also including direction reversing means selectively operated for reversing the direction of rotation of said sun gear upon release of said releasable means and engagement of said engageable means to provide a reverse drive through said transmission, the concurrent forward drive of both said sun and ring gears upon engagement of said engageable means providing a second forward drive range through said transmission.

9. A transmission as in claim 8 wherein said selectively operated direction reversing means includes a direction reversing gearset having one member thereof driven by said pump, and a clutch having a portion secured for rotation with one of said belt drives and a second portion engageable with said first portion, said second portion being connectible alternately to said reversing gearset or to the other of said belt drives for alternately providing a reverse or forward drive through said one belt drive.

10. A transmission having a forwardly rotating input shaft and an output shaft, and means operatively connecting said shafts providing a plurality of forward speed drives and a reverse drive therebetween, said means including a fluid coupling having a rotatable pump and turbine, a planetary gear set having a plurality of sun gears, pinions and a ring gear and a carrier member, means connecting said pump to said input shaft, means connecting said carrier member to said output shaft, further means operatively connecting said pump and turbine to different ones of said sun gears providing a split torque power path from said coupling to said gear set, releasable brake means for holding one of said sun gears against rotation in one direction to provide a reduction drive through said gear set, the drive of another of said sun gears providing one forward drive range of said transmission, one of said paths including a variable speed belt drive mechanism comprising a pair of serially connected endless belt drives, selectively engageable clutch means between said one sun gear and said endless belt drives, the concurrent drive of both of said sun gears upon engagement of said clutch means and release of said releasable means providing a second forward infinitely variable drive range through said transmission, and means for holding said ring gear stationary upon disengagemeent of said clutch means and release of said releasable means to provide a reverse drive through said gear set upon drive in said one range.

References Cited by the Examiner

UNITED STATES PATENTS

| 1,530,967 | 3/25 | Williams | 74—688 |
| 2,889,715 | 6/59 | De Lorean | 74—688 |

FOREIGN PATENTS

| 185,184 | 4/56 | Austria. |
| 993,867 | 7/51 | France. |
| 884,456 | 7/53 | Germany. |
| 450,246 | 7/36 | Great Britain. |

OTHER REFERENCES

Germany 1,045,788 (printed application), 12/58 (2 pp. spec. 2 shts. drg.).

DON A. WAITE, *Primary Examiner*.